Dec. 6, 1932.   H. O. BAILEY   1,890,355
HEDGE SHEARS
Filed March 9, 1932
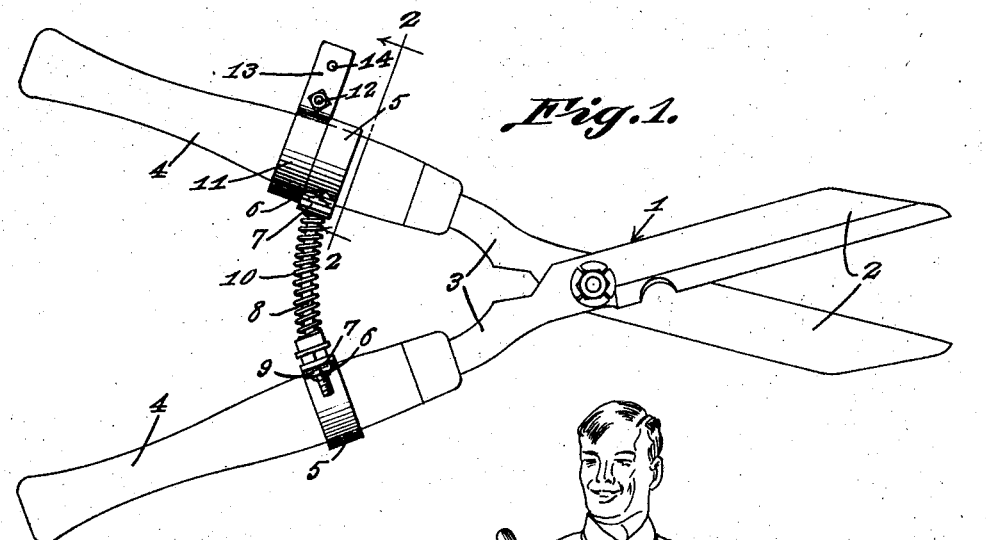
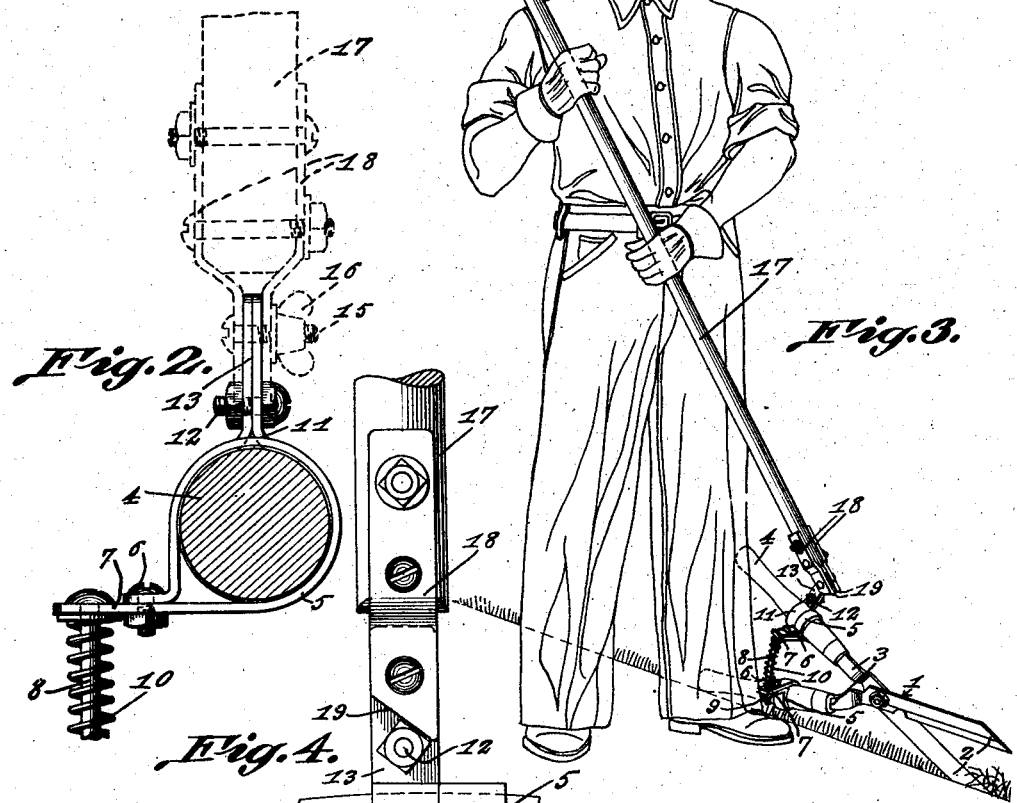
H. O. Bailey, INVENTOR
BY Victor J. Evans & Co.
ATTORNEY Patented Dec. 6, 1932

1,890,355

UNITED STATES PATENT OFFICE

HENRY O. BAILEY, OF BALTIMORE, MARYLAND

HEDGE SHEARS

Application filed March 9, 1932. Serial No. 597,787.

This invention relates to attachments for shears employed for cutting or trimming hedges and the like and has for the primary object, the provision of a device of the above stated character which may be easily and quickly applied to a conventional type of shears so that they may be employed for cutting or trimming grass and other growth, along curbing, guttering, flower beds and the like from a standing position so that such operation may be simply carried out without fatiguing the operator.

Another object of this invention is the provision of a tension means for the shears to normally urge the blades apart or into non-cutting position so that when employing the shears for trimming hedges or the like the operator will be relieved of the effort of opening the blades after each cutting action of the blades and which cooperates with the remaining portion of the present invention in moving the blades of the shears in one direction after being moved manually in the opposite direction or into cutting position.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating shears with a tension device applied thereto and forming part of my present invention.

Figure 2 is a sectional view taken on the line 2—2 of Figure 1.

Figure 3 is a perspective view illustrating the attachment applied to the shears and the latter operated from a standing position by a person.

Figure 4 is a detail view illustrating the connection of the handle to the shears.

Referring in detail to the drawing, the numeral 1 indicates a pair of shears including pivotally connected blades 2 provided with shanks 3 to which are secured hand grips 4. The foregoing description sets forth a well known type of shears especially adaptable for trimming or cutting hedges and the like and to permit such shears to be employed for trimming grass along curbing, guttering, flower beds and the like, my invention is applied to the hand grips 4.

Split bands or clamps 5 are detachably secured to the grips 4 by fasteners 6 and are provided with apertured extensions 7 one of which receives a headed bolt or rod 8 with the latter extending through the other apertured extension and secured thereto by nuts 9 threaded to said bolt or rod. An expansion spring 10 is mounted upon the rod or bolt between the extensions 7 for the purpose of normally urging the hand grips 4 away from each other causing the blades 2 to assume non-cutting position as shown in Figure 1.

A split clamp 11 is secured to one of the grips 4 adjacent the split clamp 5 thereon by a fastener 12 and has the ends thereof bent into parallelism to form an extension 13 provided with an aperture 14 to receive a bolt 15 having a wing nut 16. A handle 17 of considerable length has secured to one end plates 18 adapted to receive therebetween the extension 13 and are provided with openings to receive the bolt 15. The ends of the plates are bevelled as shown at 19 to engage with the nut 12 for the purpose of preventing the handle 17 from being moved beyond a parallel position with respect to the extension 13 in one direction but which will permit the handle to pivot relative to the extension in an opposite direction.

In operation to trim grass and other growth, the shears are positioned as shown in Figure 3 with one of the hand grips 4 engaging the ground and the blade of the other hand grip also in engagement with the ground so that on pressing downwardly on the handle 17 the blades move into cutting position severing the grass with the hand grip 4 that engages the ground acting as a fulcrum. As soon as pressure is released on the handle 17 the spring 10 moves the blades into non-cutting position whence the shears are advanced along the ground for another cutting action.

When employing the shears for trimming hedges and the like, the handle 17 is removed and the shears mounted in the usual manner, the spring 10 always acting to move the blades into non-cutting position thus relieving the operator of the effort of moving said blades in the stated position after each cutting action of the blades.

While I have shown and described the preferred embodiment of my invention, it will be understood that minor changes in construction, combination and arrangement of parts may be made without departing from the spirit and scope of my invention, as claimed.

Having thus described my invention, what I claim is:

1. In combination with shears having pivoted blades and provided with hand grips, spring means located between and connected to said grips for urging the latter apart and positioning the blades in non-cutting position, and a comparatively long handle detachably and pivotally connected to one of the grips for permitting a person to move the blades into cutting position when said shears are positioned with one blade and grip in engagement with the ground.

2. In combination with shears having pivoted blades and provided with hand grips, clamps secured to said grips, a curved rod secured to one of the clamps and slidably connected to the other clamp, spring means on said rod between the clamps to normally position the blades in non-cutting position, and means detachably connected to one of the grips for permitting a person to move the blades into cutting position when said shears are positioned with one blade and grip in engagement with the ground.

In testimony whereof I affix my signature.

HENRY O. BAILEY.